(12) United States Patent
Lee

(10) Patent No.: US 8,558,909 B2
(45) Date of Patent: Oct. 15, 2013

(54) METHOD AND APPARATUS FOR GENERATING COMPRESSED FILE, CAMERA MODULE ASSOCIATED THEREWITH, AND TERMINAL INCLUDING THE SAME

(75) Inventor: Hong Suk Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 695 days.

(21) Appl. No.: 12/550,257

(22) Filed: Aug. 28, 2009

(65) Prior Publication Data

US 2011/0025869 A1 Feb. 3, 2011

(30) Foreign Application Priority Data

Jul. 31, 2009 (KR) ........................ 10-2009-0071068

(51) Int. Cl.
*H04N 5/228* (2006.01)
*H04N 5/76* (2006.01)

(52) U.S. Cl.
USPC ................. 348/222.1; 348/231.99; 348/231.3

(58) Field of Classification Search
USPC ............... 348/222.1, 207.1–207.11; 382/166, 382/232–253
See application file for complete search history.

(56) References Cited

U.S. PATENT DOCUMENTS

| 4,982,291 | A | 1/1991 | Kurahashi et al. |
| 7,782,373 | B2 * | 8/2010 | Seo et al. ...................... 348/239 |
| 7,978,247 | B2 * | 7/2011 | Nakajima et al. ......... 348/333.04 |
| 8,045,824 | B2 * | 10/2011 | Kwon et al. .................. 382/282 |
| 8,063,953 | B2 * | 11/2011 | Kojima ..................... 348/231.99 |
| 2002/0003577 | A1 | 1/2002 | Kitsugi et al. |
| 2006/0164519 | A1 * | 7/2006 | Kaku ......................... 348/222.1 |
| 2008/0079823 | A1 * | 4/2008 | Kojima .................... 348/231.99 |
| 2009/0022479 | A1 * | 1/2009 | Kaku ........................... 386/117 |
| 2009/0167888 | A1 * | 7/2009 | Noh ........................... 348/222.1 |

FOREIGN PATENT DOCUMENTS

JP 2001-174900 6/2001

\* cited by examiner

*Primary Examiner* — Timothy J Henn
*Assistant Examiner* — Pritham Prabhakher
(74) *Attorney, Agent, or Firm* — Lee, Hong, Degerman, Kang & Waimey

(57) ABSTRACT

Provided are an apparatus for generating a compressed file, which includes a storage unit storing frame data including compressed image data; a header generator generating a header based on the frame data; and a file generator generating a compressed image file including the header and the compressed image data, a method for generating a compressed file, a camera module associated with the apparatus, and a terminal including the apparatus and the camera module.

10 Claims, 9 Drawing Sheets

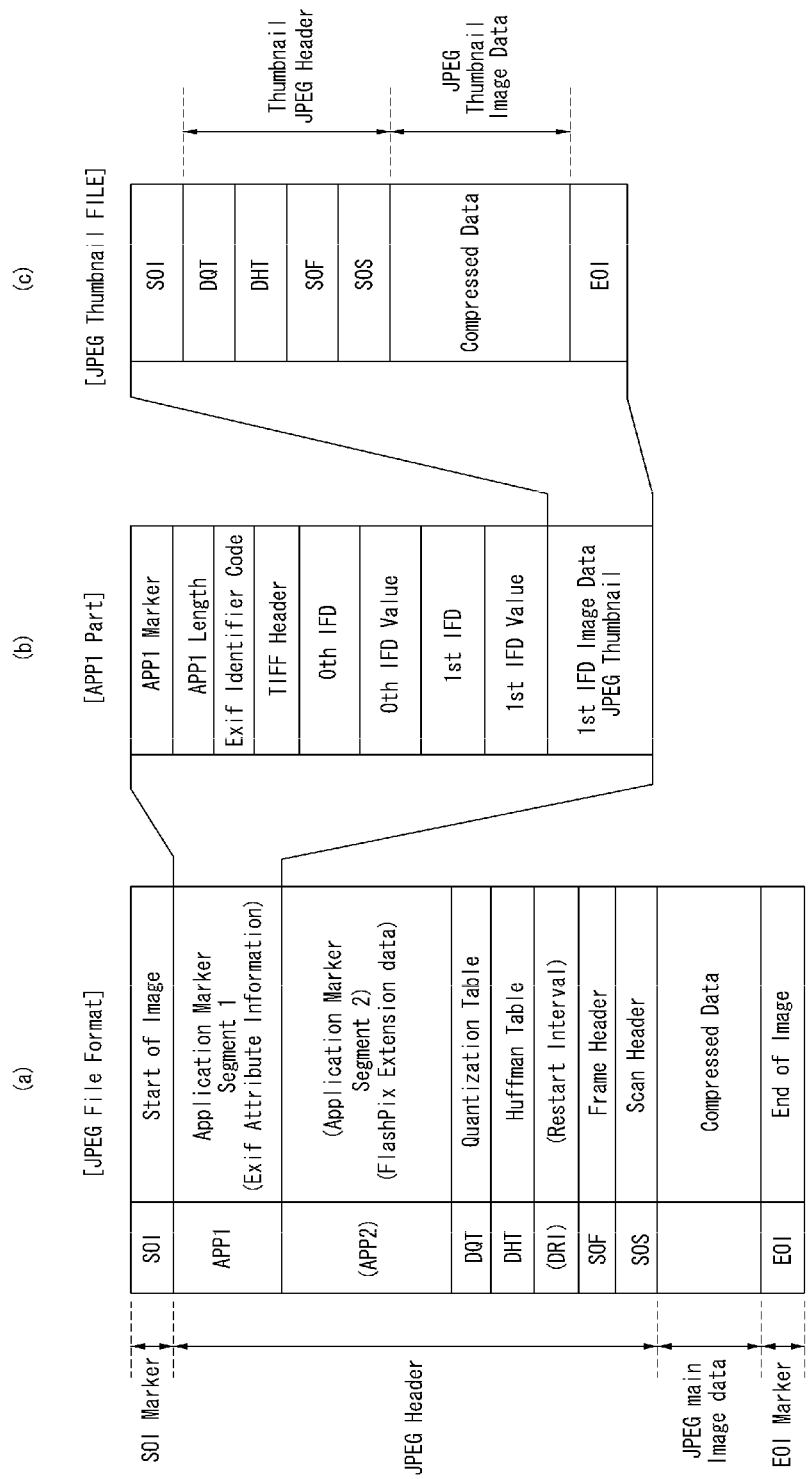

METHOD AND APPARATUS FOR GENERATING COMPRESSED FILE, CAMERA MODULE ASSOCIATED THEREWITH, AND TERMINAL INCLUDING THE SAME

CROSS-REFERENCE TO RELATED APPLICATIONS

Pursuant to 35 U.S.C. §119(a), this application claims the benefit of earlier filing date and right of priority to Korean Patent Application No. 10-2009-0071068, filed on Jul. 31, 2009.

BACKGROUND

1. Field

This document relates to image processing, and more particularly, to a method and an apparatus for generating a compressed file, a camera module associated therewith, and a terminal including the compressed file generating apparatus and the camera module.

2. Related Art

Recently, digital images have been widely applied to various fields with the rapid development of digital signal processing technology. Furthermore, the necessity for digital image processing technology increases with the development of digital communication and the spread of multimedia application fields.

Particularly, image signals require to process a large quantity of data, and thus an image compression technique is required to efficiently transmit or store digital images.

Typical examples of the image compression technique include JPEG (Joint Photographing Experts Group) which is a standard of a still image compression technique and MPEG (Moving Picture Experts Group) which is a standard of a moving picture compression technique.

It is known that JPEG is suitable for electronic apparatuses which require high-picture quality and high-resolution display because JPEG has high data compression efficiency and can represent a variety of colors. Furthermore, JPEG can control the quality and a file size of an image when the image is generated.

Based on the aforementioned advantages of JPEG, most of electronic apparatuses which have come to the market recently employ JPEG as a still image compression method. However, a method capable of compressing a large quantity of image data at a high speed with high efficiency is needed as images having higher picture quality and higher resolution are required.

Moreover, a camera module having high picture quality and high resolution of more than 1,000,000 pixels is generally mounted in a variety of electronic apparatuses as well as photographing electronic devices (for instance, a digital still camera, etc.). In particular, in a mobile terminal such as a notebook computer and a cellular phone, a function of photographing and reproducing pictures or moving pictures is one of additional functions most widely used by users, and thus the camera module is considered as an essential component that must be mounted in the mobile terminal.

However, mobile devices such as cellular phones and small electronic devices have data processing capability or/and efficiency and processing speeds inferior to those of photographing electronic apparatuses, large-sized electronic apparatuses or fixed terminals. In spite of this, conventional mobile devices and small electronic devices employ an image compression method applied to the photographing electronic apparatuses, large-sized electronic apparatuses or the fixed terminals (that is, an image compression process based on a host system in an apparatus, which will be described later with reference to FIG. 2). This decreases compression efficiency and speed and increases data processing load.

Accordingly, a new image compression method and technique specialized for mobile devices or small electronic devices and applied to the mobile devices or the small electronic devices are urgently required.

SUMMARY

It is an object of this document to provide a method and an apparatus for generating a compressed file, which is capable of improving image compression efficiency and processing speed, a camera module associated with the apparatus, and a terminal including the camera module and the apparatus.

It is another object of this document to provide a method and an apparatus for generating a compressed file, which is capable of reducing load and time for image compression in a host system in an electronic apparatus having a camera module and the host system located outside the camera module and interfaced with the camera module, a camera module associated with the apparatus, and a terminal including the camera module and the apparatus.

It is yet another object of this document to provide a method and an apparatus for generating a compressed file, which is appropriately applied to mobile electronic devices or/and small electronic devices, a camera module associated with the apparatus, and a terminal including the camera module and the apparatus.

According to an aspect of this document, there is provided an apparatus for generating a compressed file, which includes: a storage unit storing input frame data, the frame data including compressed image data; a header generator generating a header based on the frame data; and a file generator generating a compressed image file including the header and the compressed image data.

According to another aspect of this document, there is provided a method for generating a compressed file, which includes the step of: receiving frame data including compressed image data; generating a header based on the frame data; and generating a compressed image file including the header and the compressed image data.

According to another aspect of this document, there is provided a camera module including an image sensor; an encoder generating compressed image data from an image of a single frame, which is acquired by the image sensor; and a data output unit outputting frame data including the compressed image data to an external host system.

According to another aspect of this document, there is provided a terminal including a camera module which includes an image sensor, an encoder generating compressed image data from an image of a single frame acquired by the image sensor, and a data output unit outputting frame data including the compressed image data to an external host system, and the host system including a storage unit storing the frame data, a header generator generating a header based on the frame data, and a file generator generating a compressed image file including the header and the compressed image data.

The compressed file generating method and apparatus, the camera module associated with the apparatus, and the terminal including the camera module and the apparatus according to the present invention have the following advantages.

When a compressed image is generated from an acquired image, image compression efficiency and processing speed can be improved.

Furthermore, in an electronic apparatus including a camera module and a host system located outside the camera module and interfaced with the camera module, load and time for image compression the host system can be reduced.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 9 illustrates data formats of a JPEG thumbnail image file, a JPEG header and a JPEG image file, which are generated by the JPEG file generating apparatus illustrated in FIG. 6.

DETAILED DESCRIPTION OF THE PREFERRED EMBODIMENTS

Figure 1:
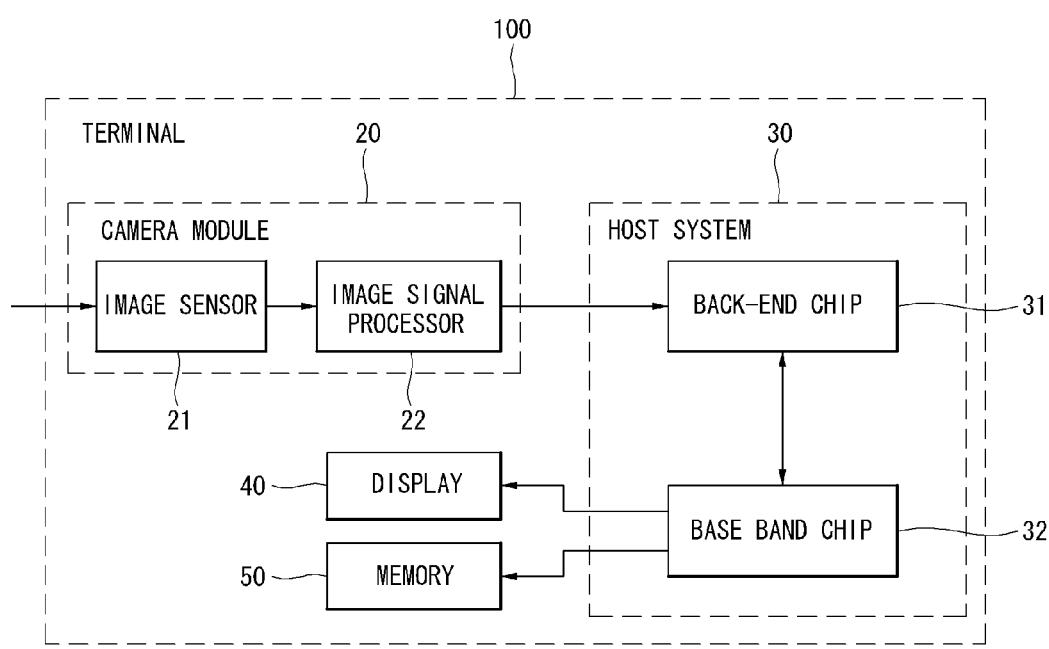
FIG. 1 is a block diagram of a terminal including a camera module and a host system, to which the present invention can be applied.

This document will now be described more fully with reference to the accompanying drawings, in which exemplary embodiments of the invention are shown. The invention may, however, be embodied in many different forms and should not be construed as being limited to the embodiments set forth herein; rather, there embodiments are provided so that this disclosure will be thorough and complete, and will fully convey the concept of the invention to those skilled in the art. Like reference numerals in the drawings denote like elements. A numeral (for example, first and second) used in the description is only a symbol for identifying a component from other components.

In the following description, suffixes "module" and "unit" are given to components in consideration of only facilitation of description and do not have meanings or functions discriminated from each other.

A terminal described in the specification can include a fixed terminal such as a digital TV, desktop computer, etc. in addition to a mobile terminal such as a cellular phone, a smart phone, a laptop computer, a digital broadcasting terminal, personal digital assistants (PDA), a portable multimedia player (PMP), a navigation system and so on.

Embodiments of this document will now be explained with reference to the attached drawings.

This document will be explained based on JPEG that is a representative still image compression technique in the following description. However, it is obvious that this document can be applied to other still image compression techniques (for example, GIP, BMP, TIF, etc.) having technical spirits identical or similar to that of the JPEG.

Furthermore, this document will be explained centering on the case that frame data including compressed image data is generated from a camera module and input to a host system of a terminal in the following description. However, this document is not limited to this case. For example, the compressed file generating apparatus and method according to this document can receive compressed image data (or frame data including the compressed image data) generated from a third device located outside the host system or the terminal and generate a compressed image file from the compressed image data or the frame data. Furthermore, this document will be explained centering on the case that the subject of generating the compressed image data is identical to the subject of generating the frame data including the compressed image data in the following description. However, the subject of generating the compressed image data may be different from the subject of generating the frame data including the compressed image data and having a specific format.

Moreover, this document will be explained centering on the case that the frame data includes other data in addition to the compressed image data. However, this document is not limited this case and the compressed image data may be the frame data. That is, the frame data may include only the compressed image data.

To help clear understanding of this document, a related technique to which the present invention can be applied is explained with reference to FIG. 1, and then a conventional JPEG image compression method which can be compared to the present invention is explained with reference to FIG. 2. Embodiments of this document are described with reference to FIGS. 3 through 9. A camera module according to the present invention is described with reference to FIGS. 3, 4 and 5 and a JPEG file generating apparatus and method are explained with reference to FIGS. 6, 7, 8 and 9. Accordingly, a terminal according to the present invention, which includes the camera module (refer to FIG. 3) and the JPEG file generating apparatus (refer to FIG. 6) will be obviously derived from the camera mode and the JPEG file generating apparatus.

FIG. 1 is a block diagram of a terminal including a camera module and a host system, to which the present invention can be applied. The descriptions of FIG. 1 other than the description relating to the conventional JPEG image compression method illustrated in FIG. 2 can be applied to the present invention.

Before starting detailed explanations of figures, components that will be described in the specification are discriminated merely according to functions mainly performed by the components or conventionally carried out according to common knowledge of concerned technical fields.

That is, two or more components which will be described later can be integrated into a single component. Furthermore, a single component which will be explained later can be separated into two or more components. Moreover, each component which will be described can additionally perform some or whole of a function executed by another component in addition to the main function thereof. Some or whole of the main function of each component which will be explained can be carried out by another component.

For instance, FIG. 1 illustrates that an image sensor 21 and an image signal processor 22 are separated from each other physically or functionally and a back-end chip 31 and a base band chip 32 are also separated from each other physically and functionally. However, this is for the purpose of facilitating discrimination between two components for convenience of illustration. With the recent tendency of function-function and miniaturization, some or whole of the function of the image signal processor 22 may be integrated into the function of the image sensor 21 or the image signal processor 22 and the image sensor 21 may be integrated into a single chip (for example, a system on chip (SOC)). Furthermore, some or whole of the function of the back-end chip 31 may be integrated into the function of the base band chip 32.

Similarly, components illustrated in FIG. 1 (FIGS. 3 and 6) do not require to be implemented as hardware components and they can be implemented in a software manner to perform the functions thereof.

Furthermore, a terminal 100 illustrated in FIG. 1 may be an image photographing electronic device such as a digital still camera. However, the following description is made centering on the case that the terminal 100 is an electronic device having a mobile communication function as a main function and an image photographing function as an additional function.

Referring to FIG. 1, the terminal 100 includes a camera module 20 having the image sensor 21 and the image signal processor 22, a host system 30 having the back-end chip 31 and the base band chip 32, a display 40 and a memory 50. Here, the host system 30 is located outside the camera module 20 and may be interfaced with the camera module 20 through serial interface or parallel interface.

The image sensor 21 receives light reflected from an object and outputs an electric signal corresponding to the quantity of the received light (intensity of light). Typical examples of the image sensor 21 include a charge coupled device (CCD) and a complementary metal oxide semiconductor (CMOS) image sensor.

When a color filter having a Bayer pattern is located on a light-receiving face of the image sensor 21, the image sensor 21 outputs an analog signal including wavelength information of red (R), green (G) and blue (B). This RGB analog signal is converted into an RGB digital signal through an analog-to-digital converter (not shown).

The image signal processor 22 converts the image signal (that is, RGB image data) output from the image sensor 21 into YCbCr (or YUV) image data. The YCbCr (or YUV) method represents an image signal as data having a luminance (Y) component and a chrominance (C) component based on the fact that the human eye is sensitive to brightness rather than colors. Furthermore, the image signal processor 22 can perform pre-processing such as pixel interpolation, gamma correction of image data and while balance control.

The image data output from the camera module 20 can be input to the back-end chip 31 of the host system 30

The back-end chip 31 can perform a function of processing (for example, encoding, decoding, scaling, etc.) the image data input thereto under the control of the base band chip 32.

For instance, the back-end chip 31 can encode the image data according to a predetermined encoding method (for example, JPEG, BMP, etc.) under the control of the base band chip 32. Here, the encoded image data can be stored in the memory 50 under the control of the base band chip 32. A conventional JPEG encoding method relating to the function of the back-end chip 31 will be explained later in more detail with reference to FIG. 2.

The back-end chip 31 can decode the encoded image data under the control of the base band chip 32. The decoded image can be displayed on the display 40 under the control of the base band chip 32. Furthermore, the back-end chip 31 can scale the image data such that the image corresponding to the image data is fitted to the screen size of the display 40 or scale the image data to a thumbnail image size under the control of the base band chip 32. Here, the scaled image can be displayed on the display 40 under the control of the base band chip 32.

The base band chip 32 controls the operations of the camera module 20 and the back-end chip 31 in association with photographing and image processing functions.

A conventional JPEG encoding method in contrast with the JPEG file generating method and apparatus and the camera module according to the present invention will now be explained.

Figure 2:
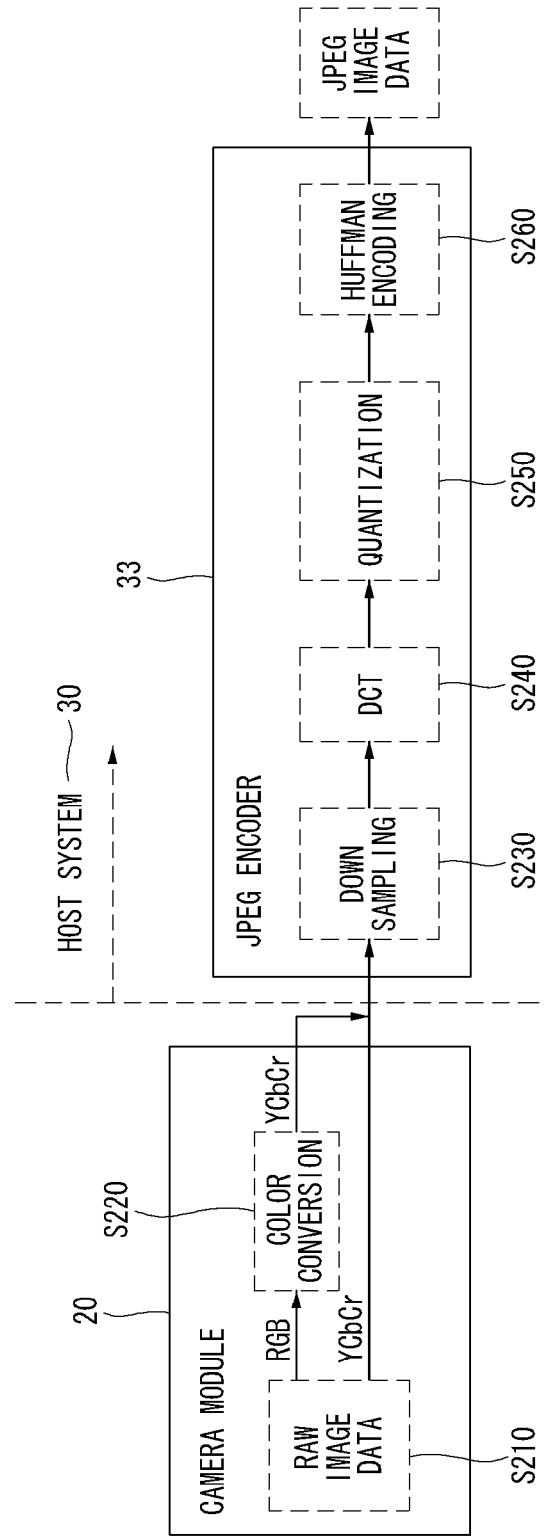
FIG. 2 illustrates a conventional JPE encoding method.

FIG. 2 illustrates the conventional JPEG encoding method. A general JPEG encoding process known through JPEG standard document is roughly described first.

The general JPEG encoding process includes down sampling S230, discrete cosine transform (DCD) S240, quantization S250 and Huffman encoding S260, as illustrated in FIG. 2. Here, the JPEG encoding process is performed on the assumption that input image data is YCbCr image data. If raw image data acquired by the camera module 20 is not YCbCr image data, the JPEG encoding process may further include color conversion S220. The color conversion S220 can be performed in the host system 30.

When the YCbCr image data is input, down sampling S230 is performed to reduce the size of the image data. The image data having the size reduced through the down sampling is divided into blocks having a predetermined size. In JPEG, data is generally divided into blocks in 8×8 matrix, which is a basic unit of JPEG compression.

DCT S240 represents Y (luminance) and C (Chrominance) components of the image data as the sum of cosine function based on discrete cosine transform corresponding to mathematical transformation formula to transform the image data. An image is divided into a low-frequency component and a high-frequency component when subjected to DCT. The low-frequency component means that there is barely brightness or color difference between neighboring pixels and the high-frequency component means that there is a large brightness or color difference between neighboring pixels. The quantity of high-frequency components is greater than the quantity of low-frequency components in an image statistically, and thus the picture quality of the image is hardly affected by removal of the high-frequency components. DCT performs compression using this principle.

Quantization S250 divides the image data that has been subjected to DCT by an arbitrary integer matrix, that is, quantization matrix, to reduce the quantity of the image data. The image data can be transformed from the spatial domain into the frequency domain by using DCT. Here, high picture quality can be obtained at a high compression rate by using the quantization.

Huffman encoding S260 corresponds to a method of generating Huffman codes. Huffman code makes the shortest average code length for a given signal generation probability distribution. If signal generation probability distribution is biased, variable length coding that gives a short code to a signal having high probability of generation and gives a long code to a signal having low probability of generation, and thus the quantity of codes can be reduced.

The above-described JPEG encoding process including color conversion, down sampling, blocking, DCT, quantization and Huffman encoding, which are sequentially carried out, can be applied to the present invention.

However, the conventional JPEG encoding method has a problem caused by the fact that JPEG encoding of a main image of a single frame acquired by the camera module 20 is performed by the host system 30 of the terminal 100. That is, the conventional JPEG encoding for generating JPEG image data is executed by a JPEG encoder 33 included in the back-end chip 31 (or base band chip 32) located in the host system 30.

According to the aforementioned conventional JPEG encoding method, uncompressed raw image data received from the camera module is accumulated in a frame buffer of the host system 30 and directly JPEG-encoded by the host system 30.

Accordingly, the conventional JPEG encoding method imposes large load on the host system 30 of the terminal 100 to decrease compression efficiency and compression rate. The large load may not affect electronic devices for photographing, such as a digital still camera, However, the load imposed on the host system may affect electronic devices other than the photographing electronic device, mobile terminals or small-sized electronic devices.

Particularly, a cellular phone is constructed such that its host system processes application associated with a mobile communication function preferentially. Accordingly, if image data having high picture quality, high resolution or large capacity is continuously accumulated in a frame buffer, a large amount of time and resources are required for the host system to compress the image data, which will be a serious problem.

A JPEG file generating method and apparatus, a camera module associated with the apparatus and a terminal including the apparatus and the camera module proposed by the present invention for the purpose of solving the aforementioned problems will now be explained. The camera module according to the present invention is explained first with reference to FIGS. 3, 4 and 5. Explanation identical to the aforementioned description is omitted.

Figure 3:
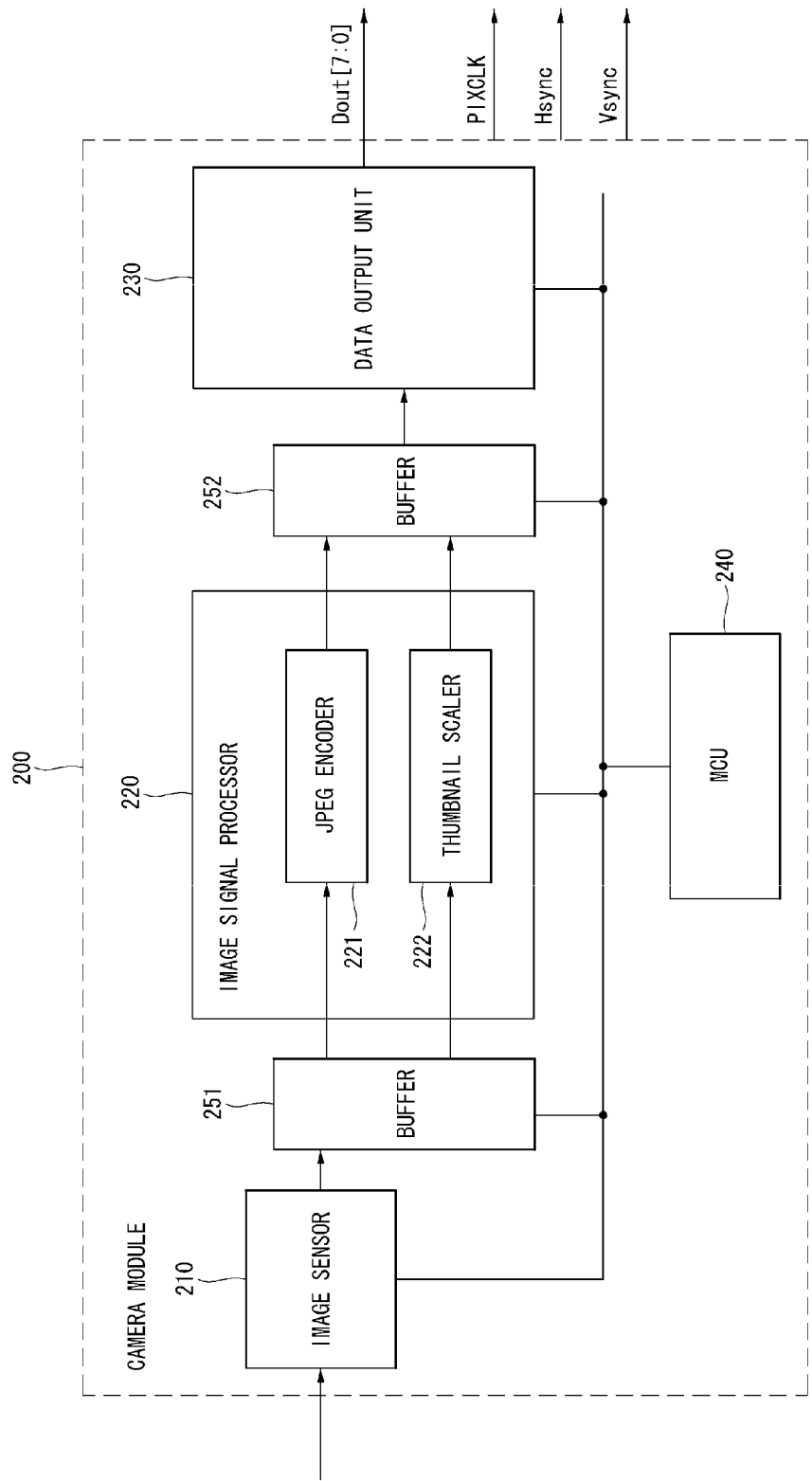
FIG. 3 is a block diagram of a camera module according to an embodiment of the present invention.

FIG. 3 is a block diagram of a camera module 200 according to an embodiment of the present invention. Referring to FIG. 3, the camera module 200 includes an image sensor 210, an image signal processor 220 having a JPEG encoder 221 and a thumbnail scaler 222, a data output unit 230, a micro control unit (MCU) 240, and buffers 251 and 252.

The JPEG encoder 221 and/or the thumbnail scaler 222 may be independent of the image signal processor 220. Furthermore, the JPEG encoder 221, the thumbnail scaler 222 and the image signal processor 220 may be implemented in a software manner as well as a hardware manner.

The image sensor 210 photographs an object and outputs an image signal corresponding to a single frame. Here, the image signal output from the image sensor 210 may correspond to an analog electric signal including wavelength information of red, green and blue, as described above. However, it is assumed that the image sensor 210 illustrated in FIG. 3 includes an analog-to-digital converter (not shown) to output RGB row image data for convenience of explanation.

If the image sensor 210 further includes a color converter, the image signal output from the image sensor 210 may be YCbCr (or YUV) raw image data.

The RGB raw image data is applied to the image signal processor 220 through the buffer 251 connected to the output terminal of the image sensor 210.

The image signal processor 220 may include an additional storage unit (not shown) for temporarily storing the input RGB raw image data. Furthermore, the image signal processor 220 may include a color converter for converting the RGB raw image data into YCbCr or YUV image data (referred to as YCbCr data hereinafter).

The RGB raw image data can be transmitted to the thumbnail scaler 222 and the YCbCr raw image data can be transmitted to the JPEG encoder 221 through the above-described configuration.

The JPEG encoder 221 generates JPEG image data from the YCbCr raw image data. For convenience of discrimination, JPEG image data generated from raw image data corresponding to a single frame is referred to as "JPEG main image data" and JPEG image data with respect to thumbnail image data is referred to as "JPEG thumbnail image data" throughout the specification.

The JPEG encoding process of the JPEG encoder 221 for generating the JPEG main image data is substantially identical to the aforementioned JPEG encoding process described with reference to FIG. 2. However, the JPEG encoding method according to the present invention is distinctly discriminated from the conventional JPEG encoding method described with reference to FIG. 2 in that the raw image data is JPEG-encoded by the camera module 200 instead of the host system of the terminal.

Furthermore, the above-described conventional JPEG encoding method imposes large load on the host system of the terminal 100 to decrease the compression efficiency and rate and increase a compression time. However, according to the JPEG encoding method of the present invention, the camera module 200 performs JPEG encoding on the raw image data acquired by the camera module 200, and thus the compression efficiency and rate can be improved.

The camera module 200 is designed to have a structure optimized for performing events such as acquisition, processing, storage and transmission of an image. Accordingly, when the camera module 200 performs JPEG encoding, the compression efficiency and compression rate are improved, load of the host system is decreased and system resource are saved, as compared to the conventional JPEG encoding performed by the host system.

The thumbnail scaler 222 scales the size of the raw image data to a predetermined thumbnail image size and outputs the thumbnail image data. Though the thumbnail image data corresponds to RGB data in the current embodiment of the present invention, the thumbnail image data can be any data if it can be displayed on a display screen.

According to another embodiment of the present invention, the thumbnail scaler 222 can be omitted from the camera module 200. This is because the host system can easily generate the thumbnail image data although the thumbnail image is one of useful functions of the terminal for allowing a user to confirm/search a plurality of images through a single picture. For instance, the host system can easily generate the thumbnail image data in such a manner that the host system easily extracts the thumbnail image data from the header of the JPEG main image data or decodes a JPEG main image file and scales the decoded file.

The thumbnail image data is not generated if the thumbnail scaler 22 is omitted as described above. In this case, the thumbnail image data is not included in 'frame data' which will be described later. This will be clearly understood from the following description.

The JPEG main image data output from the JPEG encoder 221 and the thumbnail image data output from the thumbnail scaler 222 are transmitted to the data output unit 230 via the buffer 252.

Accordingly, the JPEG main image data and the thumbnail image data can be transmitted to the host system through the data output unit 230. Data associated with an acquired image corresponding to a single frame, which will be output to the host system through the data output unit 230, is referred to as "frame data" hereinafter.

The frame data output from the data output unit 230 may have a specific transport format. An example of the transport format is illustrated in FIG. 4.

Figure 4:
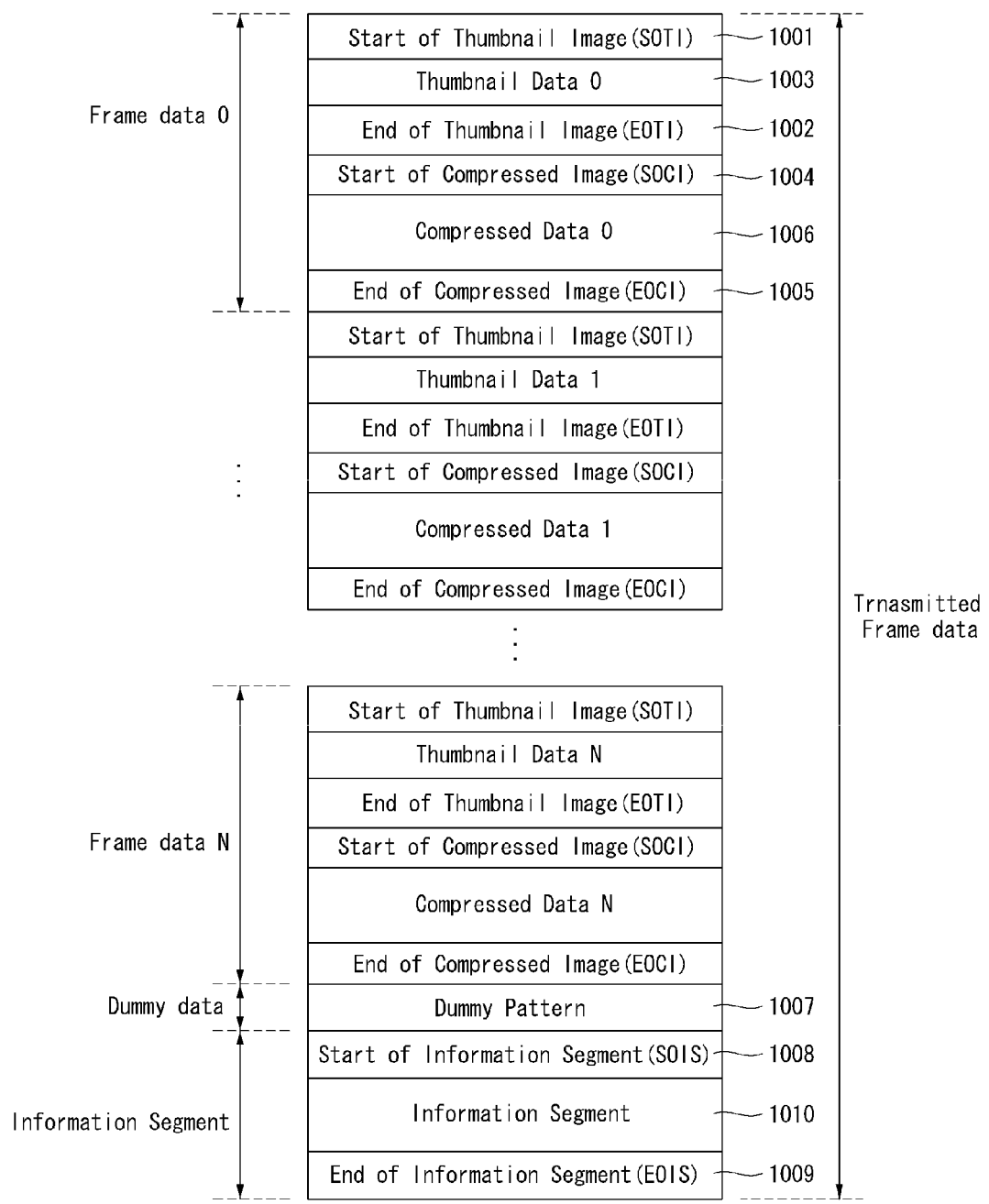
FIG. 4 illustrates an example of the format of frame data output from the camera module illustrated in FIG. 3.
Figure 5:
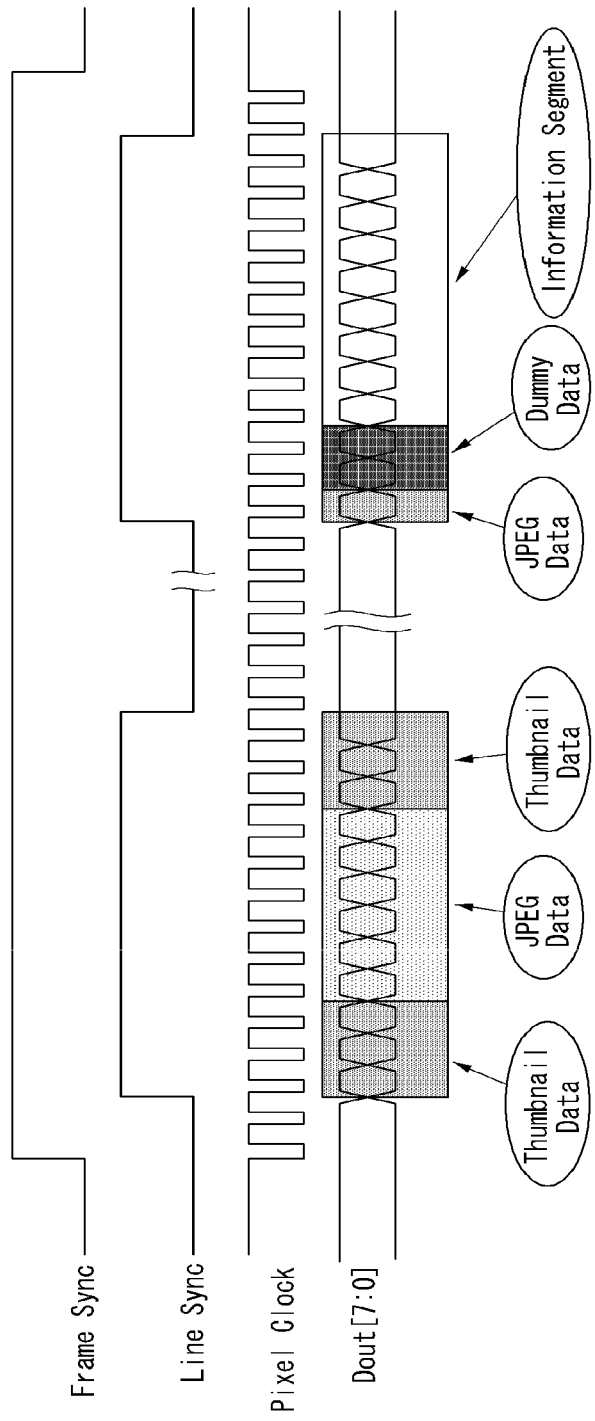
FIG. 5 illustrates a method of outputting the frame data from the camera module illustrated in FIG. 3.

Referring to FIG. 4, frame data corresponding to a single frame, which will be transmitted to the host system, includes N+1 unit frame data from frame data 0 (Frame data 0 in FIG. 4) to frame data N (Frame data N).

The unit frame data, for example, frame data 0, includes a part of the thumbnail image data 1003, a part of the JPEG main image data 1006, and predetermined markers 1001, 1002, 1004 and 1005 to be used as identifiers for the part of the thumbnail image data and the part of the JPEG main image data.

That is, in one unit frame data, the thumbnail image data can be discriminated from other data by the two markers 1001 and 1002 indicating the start and end points of the thumbnail image data and the JPEG main image data can be discriminated from other data by the two markers 1004 and 1005 indicating the start and end points of the JPEG main image data.

However, the transport format can be changed in various manners. For instance, though the four markers are embedded in one unit frame data, one or two markers can be sufficient for discriminating only the thumbnail image data and the JPEG main image data from each other. Furthermore, the order of embedding thumbnail image data and the JPEG main image data in the unit frame data can be opposite to that illustrated in FIG. 4. Moreover, unit frame data signals may respectively have different data embedding orders and different numbers of markers.

In addition, it is not required to embed both the thumbnail image data and the JPEG main image data in one unit frame data as illustrated in FIG. 4. Although FIG. 4 illustrates that both the thumbnail image data and the JPEG main image data are embedded in all the N+1 unit frame data signals in FIG. 4, the transport format is not limited thereto. The thumbnail image data has a size smaller than that of the JPEG main image data in general, and thus some of the unit frame data signals may not include the thumbnail image data because there may be no thumbnail image data to be embedded therein. Furthermore, the thumbnail image data may not exist in the frame data as described above. In this case, the unit frame data can have only one marker. When the frame data includes only the JPEG main image data as image data, particularly, it is possible to embed markers at the start and end points of the data image data.

The transport format illustrated in FIG. 4 includes dummy data 1007 and information segments 1008, 1009 and 1010 at the end of the frame data.

The dummy data 1007 is insignificant data embedded for frame synchronization according to a vertical synchronization signal. According to the present invention, the JPEG main image data may not be frame-synchronized with uncompressed image data because the JPEG main image data corresponds to JPEG compressed image data. The dummy data 1007 is used to solve this problem. Accordingly, even if the dummy data 1007 is embedded in the transport format and input to the host system, the dummy data 1007 will be filtered by a parser 720 illustrated in FIG. 6, which will be described later, The information segment 1010 includes information required to generate the JPEG header of the JPEG image file, which will be described later with reference to FIGS. 6 and 7. The information required to generate the JPEG header may include frame information on the image corresponding to a single frame, such as the main image data size, JPEG image data size, frame length or thumbnail image data size, and/or encoding information (for example, quantization table, Huffman table, DCT signal processing method, etc.) used to encode the image data.

Although the information segment is included in the transport format of the frame data in FIG. 4, the information segment is not necessarily included in the transport format because the information segment is used as basic information for generating the header of the JPEG image file or thumbnail JPEG image file and the host system can directly acquire the basic information. Furthermore, in the case of specific information, the host system may previously recognize the specific information. For example, the JPEG image data size is information transmitted from the host system to the camera module 200, and thus the host system previously recognizes the JPEG image data size.

In the present invention, the camera module 200 and the host system can be interfaced to each other using the existing interfacing method without changing the structure of the camera module 200. For example, the camera module 200 and the host system can be interfaced to each other through a vertical synchronization signal Vsync or Frame sync, a horizontal synchronization signal Hsync or Line sync, a pixel clock signal PIXCLK and a plurality of data lines Dout [7:0] (refer to FIGS. 3 and 5).

The camera module according to the present invention has been described. A JPEG file generating apparatus and method according to an embodiment of the present invention, which can be applied to the host system, will now be explained with reference to FIGS. 6, 7, 8 and 9.

Figure 6:
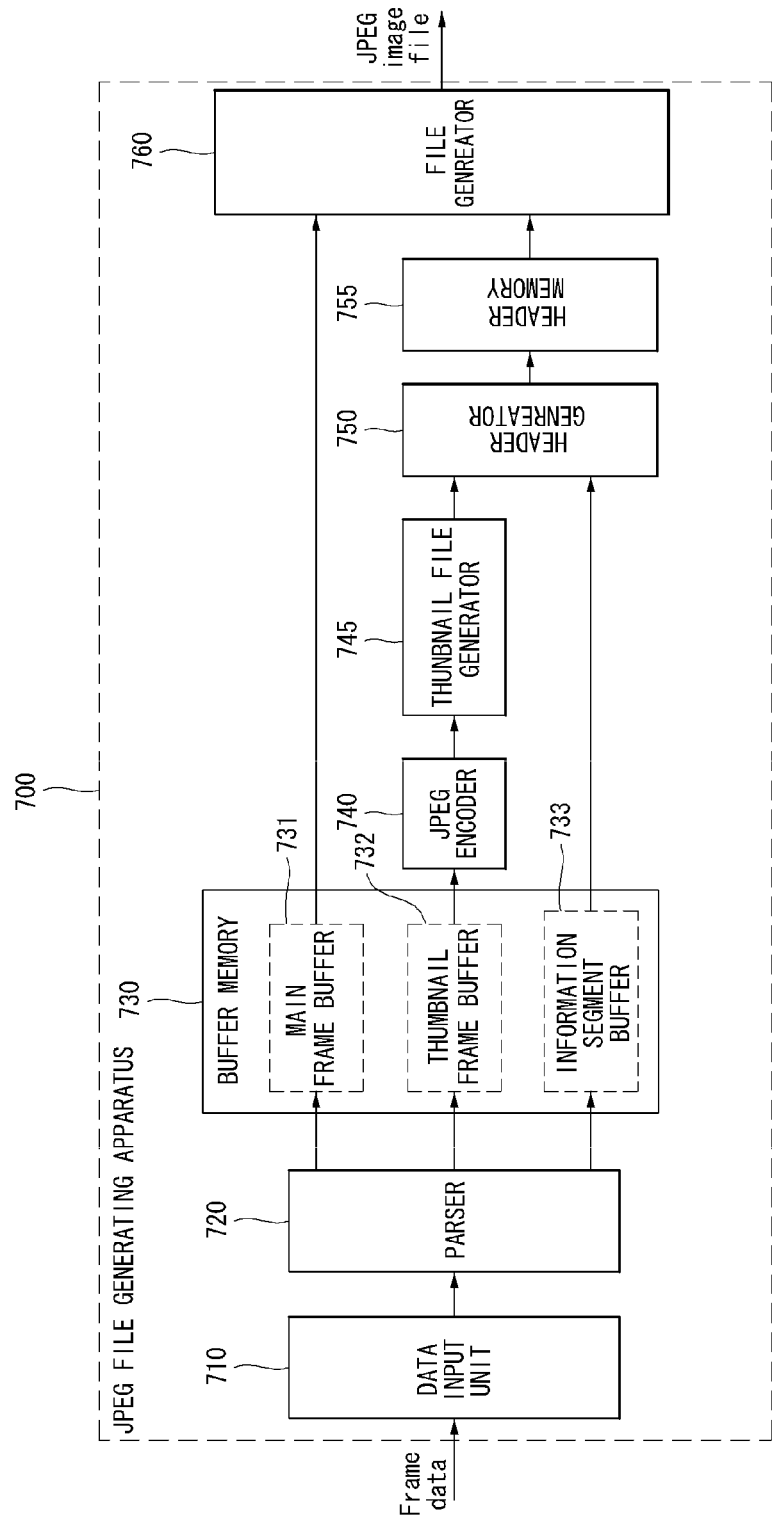
FIG. 6 is a block diagram of a JPEG file generating apparatus according to an embodiment of the present invention.
Figure 7:
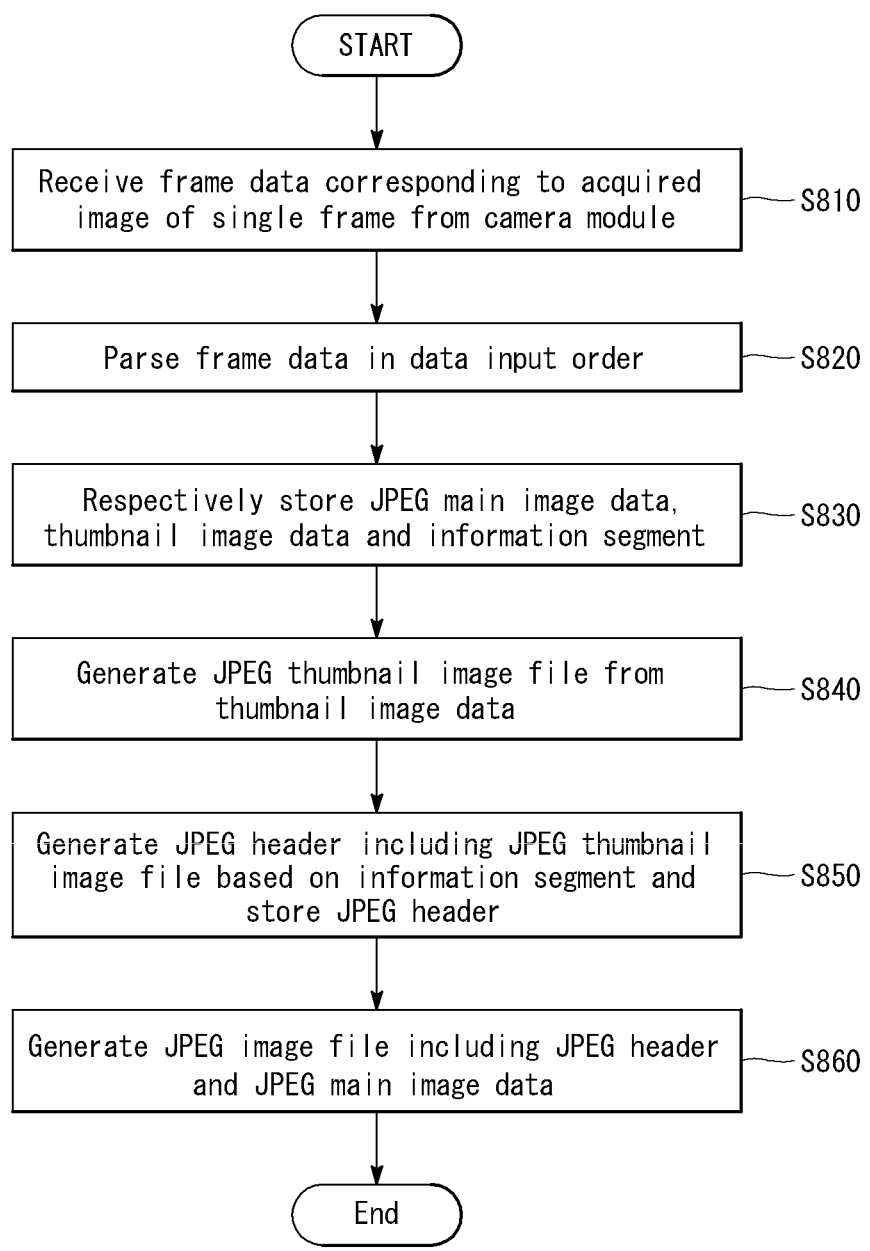
FIG. 7 is a flowchart illustrating a JPEG file generating method according to an embodiment of the present invention.
Figure 8:
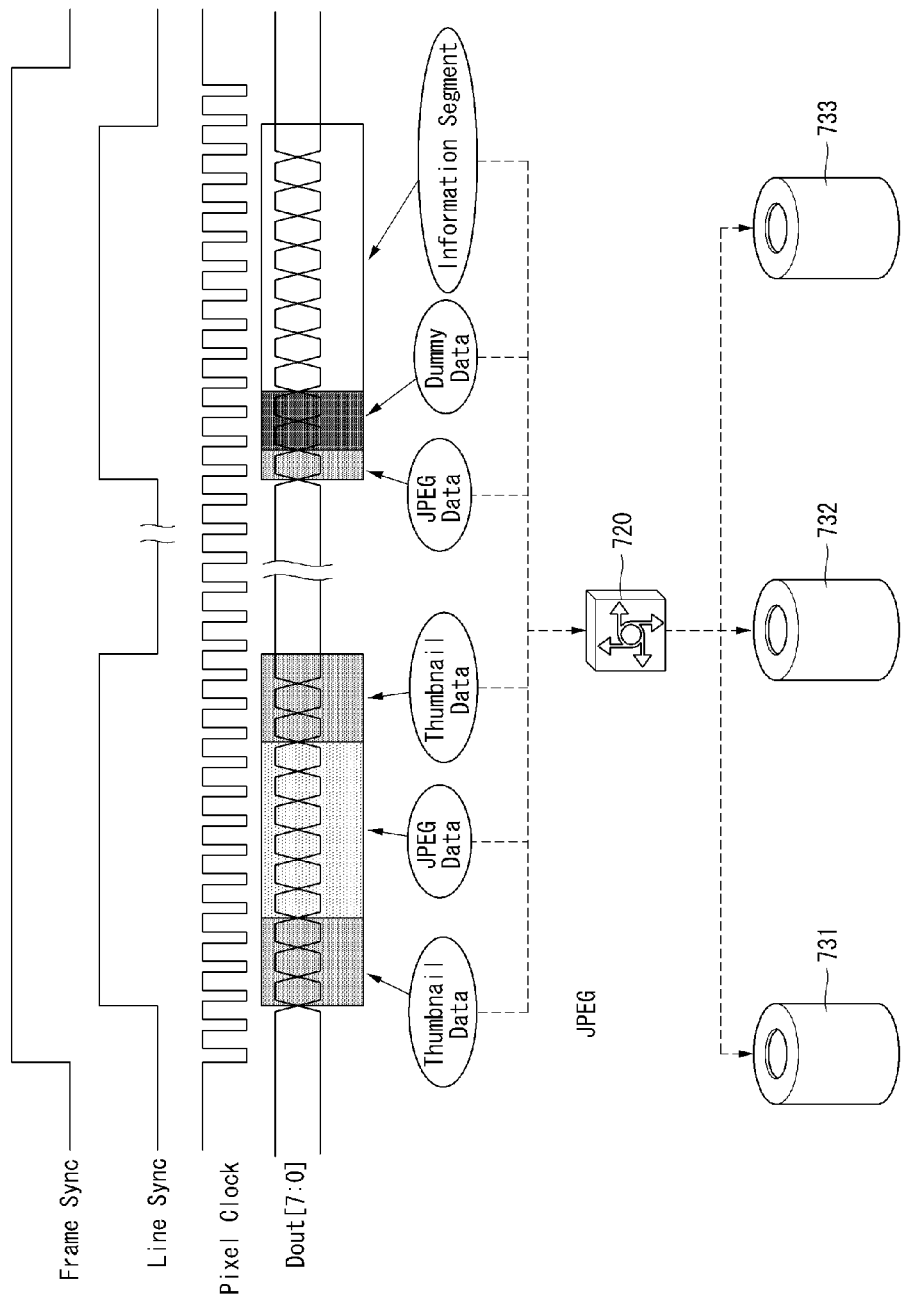
FIG. 8 illustrates a method of parsing input frame data in the JPEG file generating apparatus illustrated in FIG. 6.

FIG. 6 is a block diagram of a JPEG file generating apparatus 700 according to an embodiment of the present invention and FIG. 7 is a flowchart illustrating a JPEG file generating method according to an embodiment of the present invention. FIG. 8 illustrates a method of parsing input frame data in the JPEG file generation apparatus illustrated in FIG. 6 and FIG. 9 illustrates data formats of a JPEG thumbnail image file, a JPEG header and a JPEG image file, which are generated by the JPEG file generating apparatus illustrated in FIG. 6.

The JPEG file generating apparatus includes a data input unit 710, a parser 720, a buffer memory 730, a JPEG encoder 740, a thumbnail file generator 745, a header generator 750, a header memory 755 and a file generator 760. Here, the buffer memory 730 may include a main frame buffer 731, a thumbnail frame buffer 732 and an information segment buffer 733.

The data input unit 710 receives frame data of an acquired image corresponding to a single frame from the camera module 200 illustrated in FIG. 3 in step S810. For instance, the data input unit 710 may include a data interface for receiving the frame data and a memory for storing the received frame data. Here, the frame data can include only JPEG main image data with respect to the acquired image corresponding to a single frame, as described above with reference to FIG. 3. However, the current embodiment of the invention is described on assumption that the frame data is transmitted according to the transport format illustrated in FIG. 4 and input to the data input unit 710. That is, FIGS. 6 and 7 illustrate the JPEG file generating apparatus and method when the frame data includes thumbnail image data and information segment in addition to the JPEG main image data.

Although the transport format illustrated in FIG. 4 includes the markers and dummy data in addition to the aforementioned data, the markers and dummy data do not correspond to data that directly takes part in generating the JPEG image file, and thus the markers and dummy data are not explained. That is, the makers and dummy data are only useless data (that is, dummy data) filtered by the parser 720 or data used as basic information (that is, markers) in a data parsing operation and do not correspond to data directly used to generate the JPEG image file.

If the frame data does not include the thumbnail image data and the information segment, the parser 720, the thumbnail frame buffer 732, the information segment buffer 733, the JPEG encoder 740 and the thumbnail file generator 745 illustrated in FIG. 6 may be omitted. Furthermore, operations of the JPEG file generating method illustrated in FIG. 7, which correspond to these components, may be also omitted. This will be easily understood from the following description about the functions of the components.

When the frame data is input through the data input unit 710, the parser 720 parses the frame data in input order in step S820. Accordingly, the parser 720 can separate the JPEG main image data, the thumbnail image data and the information segment from the input frame data and respectively store the JPEG main image data, the thumbnail image data and the information segment in step S830. This operation is illustrated in FIG. 8.

The frame data is transmitted from the camera module 200 illustrated in FIG. 3 in synchronization with the vertical synchronization signal (that is, frame synchronization signal) and the horizontal synchronization signal (that is, line synchronization signal), and thus the data input unit 710 can read the frame data in synchronization with the vertical synchronization signal and the horizontal synchronization signal.

The parser 720 parses the frame data based on markers included in the frame data, and thus the JPEG main image data, the thumbnail image data and the information segment can be respectively stored in the main frame buffer 731, the thumbnail frame buffer 732 and the information segment buffer 733 immediately according to the input order. Here, the main frame buffer 731, the thumbnail frame buffer 732 and the information segment buffer 733 may be implemented as physically separated storage media or implemented as different storage spaces in a single storage medium. This can be applied to all the components associated with storage media which will be explained throughout the specification.

The thumbnail image data stored in the thumbnail frame buffer 732 is JPEG-encoded through the JPEG encoder 740 to generate JPEG thumbnail image data. If the thumbnail image data is RGB data, an operation of converting the thumbnail image data into YCbCr data through color conversion can be performed prior to the JPEG encoding operation.

The thumbnail file generator 745 receives the JPEG thumbnail image data and generates a JPEG thumbnail image file including the JPEG thumbnail image data and a thumbnail JPEG header in step S840 (refer to FIG. 9(*c*)). Here, the thumbnail JPEG header can be generated by using the information segment stored in the information segment buffer 733. Furthermore, the thumbnail file generator 745 can acquire/calculate basic information for generating the thumbnail JPEG header from the thumbnail image data stored in the thumbnail frame buffer 732.

The JPEG thumbnail image file generated by the thumbnail file generator 745 is input to the header generator 750. The header generator 750 can acquire basic information required to generate the JPEG header from the information segment stored in the information segment buffer 733 and generate the JPEG header by using the basic information. Here, the JPEG thumbnail image file is embedded in the JPEG header (Refer to FIG. 9(*b*)). The JPEG header is stored in the header memory 755 in step S850.

The file generator 760 can generate a single JPEG image file by using the JPEG header stored in the header memory 755 and the JPEG main image data stored in the main frame buffer 731 in step S860.

For example, the file generator 760 can continuously memory-copy the JPEG header stored in the header memory 755 and the JPEG main image data to generate the single JPEG image file including the JPEG header and the JPEG main image data (Refer to FIG. 9(*a*)).

Referring to FIGS. 6, 7, 8 and 9, the thumbnail file generator 745 according to the current embodiment of the invention receives the JPEG encoded (that is, JPEG compressed) thumbnail image data and generates the JPEG thumbnail image file.

According to another embodiment of the present invention, however, the thumbnail file generator 745 may receive a thumbnail image which is not JPEG encoded (that is, which is not JPEG compressed) and reconfigure the thumbnail image according to JPEG format to generate a pseudo JPEG thumbnail image file. That is, the pseudo JPEG thumbnail image file is uncompressed and only the format thereof conforms to JPEG format. In this case, the thumbnail image can be immediately displayed on a display screen without having an additional decoding operation by extracting the pseudo JPEG thumbnail image file embedded in the JPEG header of the JPEG image file (corresponding to the JPEG image file finally generated through step S860 of FIG. 7).

According to the JPEG file generating method and apparatus according to the present invention, the host system receives the JPEG main image data that has been JPEG encoded from the camera module, and thus the host system is not required to encode the main image. Accordingly, data processing load imposed on the host system and waste of system resources can be reduced.

Furthermore, a JPEG image file corresponding to an image of a single frame can be generated easily and rapidly by continuously memory-copying image data stored in the frame buffer, as described above.

While this document has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for generating a compressed file, the apparatus comprising:
  a camera module configured to:
    generate raw image data by photographing an object,
    generate compressed image data from the raw image data,
    output a vertical synchronization signal, and
    output frame data including the compressed image data and thumbnail image data in response to the vertical synchronization signal; and
  a host system configured to:
    receive the frame data from the camera module in response to the vertical synchronization signal,
    parse the frame data based on a marker that indicates information for discriminating between the compressed image data and the thumbnail image data,
    separately store the compressed image data and the thumbnail image data,
    generate a header based on the frame data, and
    generate a compressed image file including the header and the compressed image data.

2. The apparatus of claim 1, wherein the host system is further configured to:
  generate compressed thumbnail image data and a thumbnail header based on the stored thumbnail image data; and
  generate a compressed thumbnail image file including the compressed thumbnail image data and the thumbnail header,
  wherein the compressed image file further includes the compressed thumbnail image file.

3. The apparatus of claim 1, wherein:
  the camera module outputs the frame data in synchronization with the vertical synchronization signal; and
  the host system receives the frame data in synchronization with the vertical synchronization signal.

4. The apparatus of claim 3, wherein:
  the compressed image data is not frame-synchronized with the raw image data; and
  the frame data further includes dummy data for frame-synchronization according to the vertical synchronization signal.

5. The apparatus of claim 1, wherein:
  the frame data further includes an information segment that includes at least frame information required for generating the header and code information required for coding the frame data; and
  the host system generates the header based on the information segment.

6. The apparatus of claim 1, wherein the host system generates the compressed image file by continuously copying the header and the compressed image data from a memory.

7. A method for generating a compressed file in a terminal having a camera module and a host system interfaced with the camera module, the method comprising:
  generating, via the camera module, raw image data by photographing an object;
  generating, via the camera module, compressed image data from the raw image data; and
  outputting, via the camera module, a vertical synchronization signal to the host system;
  outputting, via the camera module, frame data including the compressed image data and thumbnail image data to the host system in response to the vertical synchronization signal;
  receiving, via the host system, the frame data in response to the vertical synchronization signal;
  parsing the frame data based on a marker that indicates information for discriminating between the compressed image data and the thumbnail image data,
  separately storing the compressed image data and the thumbnail image data,
  generating, via the host system, a header based on the frame data; and
  generating, via the host system, a compressed image file including the header and the compressed image data.

8. The method of claim 7, further comprising:
  generating, via the host system, compressed thumbnail image data and a thumbnail header based on the stored thumbnail image data; and
  generating, via the host system, a compressed thumbnail image file including the compressed thumbnail image data and the thumbnail header,
  wherein the compressed image file further includes the compressed thumbnail image file.

9. The method of claim 7, wherein:
  the frame data further includes an information segment that includes at least frame information required for generating the header and coding information required for coding the frame data; and
  the header is generated based on the information segment.

10. The method of claim 7, further comprising:
  storing the compressed image data; and
  storing the header; and
  generating the compressed image file by copying the header and the compressed image data from a memory.

* * * * *